(12) United States Patent
Strater et al.

(10) Patent No.: US 11,757,521 B2
(45) Date of Patent: Sep. 12, 2023

(54) METHOD AND CONTROL OF HOP LIMITATION IN WI-FI MULTI-ACCESS POINT DEVICE NETWORK

(71) Applicant: ARRIS Enterprises LLC, Suwanee, GA (US)

(72) Inventors: Jay William Strater, San Diego, CA (US); Diwya Kandagath Mohanan, Bangalore (IN); Chethan Alur Gurumallappa, Bengaluru (IN); Christophe Piel, Le Plessis Pâté (FR)

(73) Assignee: ARRIS ENTERPRISES LLC, Suwanee, GA (US)

( * ) Notice: Subject to any disclaimer, the term of this patent is extended or adjusted under 35 U.S.C. 154(b) by 0 days.

(21) Appl. No.: 17/963,333

(22) Filed: Oct. 11, 2022

(65) Prior Publication Data

US 2023/0035263 A1    Feb. 2, 2023

Related U.S. Application Data

(63) Continuation of application No. 17/242,858, filed on Apr. 28, 2021, now Pat. No. 11,502,742.

(Continued)

(51) Int. Cl.
*H04B 7/15* (2006.01)
*H04B 7/155* (2006.01)
(Continued)

(52) U.S. Cl.
CPC ....... *H04B 7/15507* (2013.01); *H04L 45/122* (2013.01); *H04W 84/12* (2013.01)

(58) Field of Classification Search
CPC combination set(s) only.
See application file for complete search history.

(56) References Cited

U.S. PATENT DOCUMENTS

| 10,542,486 | B1 | 1/2020 | Strater et al. | |
| 2015/0049671 | A1* | 2/2015 | Jafarian | H04B 1/16 370/328 |

(Continued)

OTHER PUBLICATIONS

International Preliminary Report on Patentability and Written Opinion dated Mar. 9, 2023 in International Application No. PCT/US2021/029616.

(Continued)

*Primary Examiner* — Hashim S Bhatti
(74) *Attorney, Agent, or Firm* — Wenderoth, Lind & Ponack, L.L.P.

(57) ABSTRACT

WLAN access point configured to: configure a first wireless extender device not to exceed a hop limit; cause the first wireless extender device to initiate messaging with a root APD via a root fronthaul BSS to receive credentials for a backhaul BSS; cause the first wireless extender device to onboard onto the root APD via the backhaul BSS using the received credentials; enable a second wireless extender device to initiate messaging via the first fronthaul BSS of the first wireless extender device to obtain the credentials for the backhaul BSS; and prevent, in a case that the hop limit has been reached, the second wireless extender device from onboarding onto the backhaul BSS of the first wireless extender device so as to cause the second wireless extender device to onboard onto either the root APD or another wireless extender device.

20 Claims, 17 Drawing Sheets

Related U.S. Application Data

(60) Provisional application No. 63/071,801, filed on Aug. 28, 2020.

(51) Int. Cl.
  *H04L 45/122*   (2022.01)
  *H04W 84/12*    (2009.01)

(56) References Cited

U.S. PATENT DOCUMENTS

| | | |
|---|---|---|
| 2018/0302832 A1 | 10/2018 | Huang et al. |
| 2019/0281608 A1 | 9/2019 | Huang et al. |
| 2020/0204974 A1 | 6/2020 | Strater et al. |
| 2021/0385778 A1* | 12/2021 | Ahn ............... H04W 48/08 |
| 2022/0150721 A1* | 5/2022 | Zebulon ............ H04L 1/0001 |

OTHER PUBLICATIONS

International Search Report and the Written Opinion of the International Searching Authority dated Sep. 1, 2021 in International (PCT) Application No. PCT/US2021/029616.

\* cited by examiner

METHOD AND CONTROL OF HOP LIMITATION IN WI-FI MULTI-ACCESS POINT DEVICE NETWORK

BACKGROUND

Embodiments of the invention relate to configure and control hop limitation in a Wi-Fi multi-access point device network.

SUMMARY

Aspects of the present invention are drawn to a wireless local area network (WLAN) access point controller device for use with a root access point device (APD), a first wireless extender device, and a second wireless extender device, the root APD having a root fronthaul basic service set (BSS) and a root backhaul BSS, the first wireless extender device having a first fronthaul BSS and a first backhaul BSS. The WLAN access point controller device includes a memory and a processor. The processor is configured to execute instructions stored on the memory to cause the WLAN access point controller to: configure the first wireless extender device not to exceed a configurable hop limit; cause the first wireless extender device to initiate messaging with the root APD via the root fronthaul BSS to receive credentials for the root backhaul BSS; cause the first wireless extender device to onboard onto the root APD via the root backhaul BSS using the received credentials; enable the second wireless extender device to initiate messaging to the first fronthaul BSS of the first wireless extender device to obtain the credentials for the first backhaul BSS; and prevent the second wireless extender device from onboarding onto the backhaul BSS of the first wireless extender device, in a case where the backhaul hop limit is configured to be one, so as to cause the second wireless extender device to only be permitted to onboard onto the root APD.

In some embodiments, the processor is configured to cause the WLAN access point controller device to prevent, in a case that a configured $n^{th}$ hop limit has been reached, an n+1 wireless extender device from onboarding onto the backhaul BSS of an $n^{th}$ wireless extender device so as to force the n+1 wireless extender device instead to be onboarded onto the root APD or a another wireless extender device that is n−1 hops or less from the root APD by disabling the backhaul BSS of the first wireless extender and blacklisting any other wireless extender devices on a fronthaul BSS of the $n^{th}$ wireless extender device.

In some embodiments, the processor is configured to cause the WLAN access point controller device to prevent, in a case that a configured $n^{th}$ hop limit has been reached, an n+1 wireless extender device from onboarding onto the backhaul BSS of an $n^{th}$ wireless extender device so as to force it instead to onboard onto the root APD or another wireless extender device that is n−1 hops or less from the root APD by configuring a zero-association count restriction on the backhaul BSS of the $n^{th}$ wireless extender device.

In some embodiments, the processor is configured to cause the WLAN access point controller device to configure the zero-association count restriction on the backhaul BSS of the $n^{th}$ wireless extender device via a higher layer data type-length-value (TLV) field.

In some embodiments, the processor is configured to cause the WLAN access point controller device to prevent, in a case that a configured $n^{th}$ hop limit is reached, an n+1 wireless extender device from onboarding onto the backhaul BSS of an $n^{th}$ wireless extender device so as to force the $n^{th}$ wireless extender device to instead onboard onto the root APD or another wireless extender device that is n−1 hops or less from the root APD by whitelisting, on the backhaul BSS of the $n^{th}$ wireless extender device, either no wireless extender devices or a dummy wireless extender device.

Other aspects of the present invention are drawn to a method of operating a WLAN access point controller device with a first wireless extender device, a root APD, and a second wireless extender device, the root APD having a root fronthaul BSS and a root backhaul BSS, the second wireless extender device having a first fronthaul BSS and a first backhaul BSS. A method includes: configuring, via a processor configured to execute instructions stored on a memory, the first wireless extender device not to exceed a configurable hop limit; causing, via the processor, the first wireless extender device to initiate messaging with the root APD via the root fronthaul BSS to receive credentials for the root backhaul BSS; causing, via the processor, the first wireless extender device to onboard onto the root APD via first the backhaul BSS using the obtained credentials; enabling, via the processor, the second wireless extender device to initiate messaging to the first fronthaul BSS of the first wireless extender device to obtain the credentials for the first backhaul BSS; and preventing, via the processor and in a case that the configurable hop limit is configured to be one, the second wireless extender device from onboarding onto the backhaul BSS of the first wireless extender device so as to cause the second wireless extender device to only be permitted to onboard onto the root APD.

In some embodiments, the method further includes preventing, via the processor and in a case that a configured $n^{th}$ hop limit has been reached, an n+1 wireless extender device from onboarding onto the backhaul BSS of an $n^{th}$ wireless extender device so as to force the n+1 wireless extender device instead to be onboarded onto the root APD or another wireless extender device that is n−1 hops or less from the root APD by disabling the backhaul BSS of the first wireless extender and blacklisting any other wireless extender devices on a fronthaul BSS of the $n^{th}$ wireless extender device.

In some embodiments, the method further includes preventing, via the processor and in a case that a configured $n^{th}$ hop limit has been reached, an n+1 wireless extender device from onboarding onto the backhaul BSS of an $n^{th}$ wireless extender device so as to onboard onto the root APD or another wireless extender device that is n−1 hops or less from the root APD by configuring a zero-association count restriction on the backhaul BSS of the $n^{th}$ wireless extender device.

In some embodiments, the method further configuring includes configuring, via a high layer data TLV, the zero-association count restriction on the backhaul BSS of an $n^{th}$ extender device.

In some embodiments, the method further includes preventing, via the processor and in a case that a configured $n^{th}$ hop limit is reached, an n+1 wireless extender device from onboarding onto the backhaul BSS of an $n^{th}$ wireless extender device so as to force the $n^{th}$ wireless extender device to instead onboard onto the root APD or another wireless extender device that is n−1 hops or less from the root APD by whitelisting, on the backhaul BSS of the $n^{th}$ wireless extender device, either no wireless extender devices or a dummy wireless extender device.

Other aspects of the present invention are drawn to a non-transitory, computer-readable media having computer-readable instructions stored thereon, the computer-readable instructions being capable of being read by a WLAN access point controller device with a first wireless extender device, a root APD, and a second wireless extender device, the root APD having a root fronthaul BSS and a root backhaul BSS, the second wireless extender device having a first fronthaul BSS and a first backhaul BSS, wherein the computer-readable instructions are capable of instructing the WLAN access point controller device to perform the method: configuring, via a processor configured to execute instructions stored on a memory, the first wireless extender device not to exceed a configurable hop limit; causing, via the processor, the first wireless extender device to initiate messaging with the root APD via the root fronthaul BSS to receive credentials for the root backhaul BSS; causing, via the processor, the first wireless extender device to onboard onto the root APD via the backhaul BSS using the obtained credentials; enabling, via the processor, the second wireless extender device to initiate messaging to the first fronthaul BSS of the first wireless extender device to obtain the credentials for the first backhaul BSS; and preventing, via the processor and in a case that the configurable hop limit is configured to be one, the second wireless extender device from onboarding onto the backhaul BSS of the first wireless extender device so as to cause the second wireless extender device to only be permitted to onboard onto the root APD.

In some embodiments, a non-transitory, computer-readable media includes the computer-readable instructions are capable of instructing the WLAN access point controller device to perform the method further including preventing, via the processor and in a case that a configured $n^{th}$ hop limit has been reached, an n+1 wireless extender device from onboarding onto the backhaul BSS of an $n^{th}$ wireless extender device so as to force the n+1 wireless extender device instead to be onboarded onto the root APD or another wireless extender device that is n−1 hops or less from the root APD by disabling the backhaul BSS of the first wireless extender and blacklisting any other wireless extender devices on a fronthaul BSS of the $n^{th}$ wireless extender device.

In some embodiments, a non-transitory, computer-readable media includes the computer-readable instructions are capable of instructing the WLAN access point controller device to perform the method further including preventing, via the processor and in a case that a configured $n^{th}$ hop limit has been reached, an n+1 wireless extender device from onboarding onto the backhaul BSS of an $n^{th}$ wireless extender device so as to onboard onto the root APD or another wireless extender device that is n−1 hops or less from the root APD by configuring a zero-association count restriction on the backhaul BSS of the $n^{th}$ wireless extender device.

In some embodiments, a non-transitory, computer-readable media includes the computer-readable instructions are capable of instructing the WLAN access point controller device to perform the method wherein the configuring includes configuring, via a higher layer data TLV field, the zero-association count restriction on the backhaul BSS of an $n^{th}$ wireless extender device.

In some embodiments, a non-transitory, computer-readable media includes the computer-readable instructions are capable of instructing the WLAN access point controller device to perform the method further including preventing, via the processor and in a case that a configured $n^{th}$ hop limit is reached, an n+1 wireless extender device from onboarding onto the backhaul BSS of an $n^{th}$ wireless extender device so as to force the $n^{th}$ wireless extender device to instead onboard onto the root APD or another wireless extender device that is n−1 hops or less from the root APD by whitelisting, on the backhaul BSS of the $n^{th}$ wireless extender device, either no wireless extender devices or a dummy wireless extender device.

BRIEF SUMMARY OF THE DRAWINGS

The accompanying drawings, which are incorporated in and form a part of the specification, illustrate example embodiments and, together with the description, serve to explain the principles of the invention. In the drawings:

FIG. 1A illustrates structural components implementing an electronic communication network at time to;

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the examples described herein can be made without departing from the spirit and scope of the present disclosure.

The Wi-Fi Alliance (WFA) EasyMesh is a program for specifying and certifying basic functionality in a small/residential Wi-Fi multi-access point (MAP) solution. In the MAP spec, mesh APDs contain a MAP agent for assorted Wi-Fi functionality including local Wi-Fi driver control, status and statistics access, other MAP agent discovery, MAP controller communication, and other MAP agent onboarding support.

Initially, the MAP agent on a common device with the MAP controller (e.g. residential router) will be provisioned for appropriate Wi-Fi BSS support. This includes fronthaul BSS support for client device access as well backhaul BSS support for communication with any downlink MAP agent devices. When a new device with a MAP agent (e.g. wireless extender) needs to be added to the network (as a downlink APD) by way of an existing (uplink APD), the MAP specification provides an extension of the WFA Simple Configuration (aka WPS) messaging to support this operation.

In particular when WPS pairing is initiated on both a new MAP agent device and an existing MAP agent device (e.g. via push button operations), the new MAP agent device's backhaul STA (bSTA) will initiate WPS M1 messaging with the existing MAP agent device's fronthaul BSS, and will include a MAP extension sub-element that indicates that it needs the backhaul BSS credentials of the uplink device it is trying to associate with. The existing MAP agent device will respond with WPS M2 messaging with MAP extension sub-element indicating support for its fronthaul BSS and backhaul BSS services. After this backhaul BSS credentials are provided by the existing MAP agent, the new MAP agent bSTA will associated with the existing MAP Agent's backhaul BSS. This then allows the new MAP agent to be part of the network, including finding and getting configured by the MAP controller.

Figure 1A:
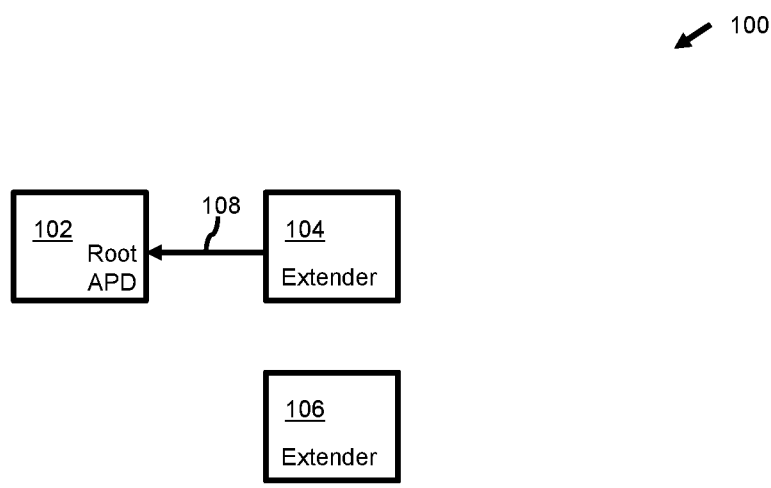

FIG. 1A illustrates structural components implementing a Wi-Fi communication network (or WLAN) 100 at time $t_0$. WLAN 100 includes a root APD 102 and a plurality of wireless extenders, a sample of which are illustrated as a wireless extender device 104 and a wireless extender device 106.

Root APD 102, also referred to as a gateway, residential gateway, or RG, is an electronic device that is to be located so as to establish a local area network (LAN) at a consumer premises. The consumer premises can include a residential dwelling, office, or any other business space of a user. The terms home, office, and premises may be used synonymously herein. Root APD 102 may be any device or system that is operable to allow data to flow from one discrete network to another. Root APD 102 may perform such functions as web acceleration and HTTP compression, flow control, encryption, redundancy switchovers, traffic restriction policy enforcement, data compression, TCP performance enhancements (e.g., TCP performance enhancing proxies, such as TCP spoofing), quality of service functions (e.g., classification, prioritization, differentiation, random early detection (RED), TCP/UDP flow control), bandwidth usage policing, dynamic load balancing, and routing. Root APD 102 also contains a multi-access point (MAP) agent for assorted Wi-Fi functionalities including local Wi-Fi driver control, status and statistics access, other MAP Controller communication, and other MAP Agent onboarding support.

Root APD 102 establishes, or is part of, wireless network 100, using Wi-Fi for example, such that extender devices 102 and 106 are able to communicate wirelessly with root APD 102. The term Wi-Fi as used herein may be considered to refer to any of Wi-Fi 4, 5, 6, 6E, or any variation thereof.

Root APD 102 serves as a gateway or access point to the external network, e.g., the Internet, for one or more client devices that wirelessly communicate with root APD 102 via, e.g., Wi-Fi.

Wireless extender device 104 can be paired with root APD 102 in order to communicate wirelessly with root APD 102 and extend the coverage area of WLAN 100. The establishment of the operative communications between wireless extender device 104 and root APD 102 is referred to as onboarding the extender.

As shown in FIG. 1A, wireless extender device 104 communicates with root APD, using uplink communication stream 108, to start the onboarding process at time to. Wireless extender device 104 uses communication stream 108 to request for appropriate Wi-Fi BSS support. This includes fronthaul BSS support for client (STA) access as well as backhaul BSS support for communication with any downlink MAP Agent devices. When wireless extender device 104 (as a MAP agent) needs to be added to the WLAN 100 (as a downlink access point) to an existing uplink access point, root APD 102, the MAP specification provides an extension of the Wi-Fi protected setup (WPS) configuration messaging to support this. Wireless extender device 106, on the other hand, is sitting idly in the network waiting for wireless extender device 104 to complete the onboarding process via root APD 102.

Figure 1B:
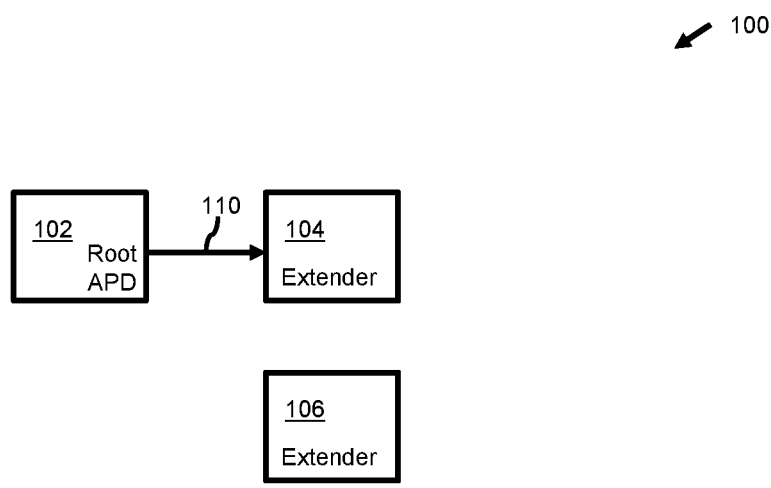
FIG. 1B illustrates the Wi-Fi communication network in FIG. 1A at time $t_1$.

FIG. 1B illustrates wireless network 100 at time $t_1$. At this time, root APD 102 responds to wireless extender device 104, using downlink communication stream 110, to provide the Wi-Fi BSS support which includes both fronthaul BSS and backhaul BSS credentials for wireless extender device 104 to use. After the backhaul BSS credentials are provided by root APD 102, wireless extender device 104 backhaul STA will associate with root APD 102 backhaul BSS. This, then, allows wireless extender device 104 to be part of wireless network 100, including finding and getting configuration by the MAP controller.

Figure 1C:
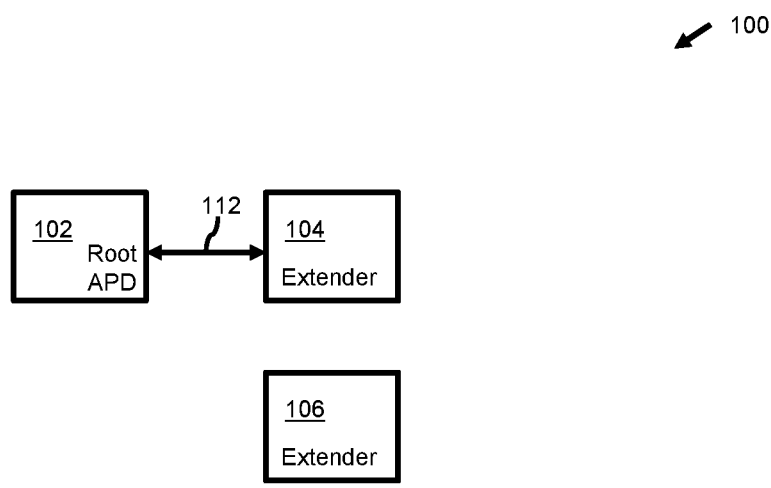
FIG. 1C illustrates the Wi-Fi communication network in FIG. 1A at time $t_2$.

FIG. 1C illustrates the Wi-Fi communication network in FIG. 1A at time $t_2$. At this time, wireless extender device 104 has successfully completed the onboarding process and is now part of the wireless network 100. All communications between root APD 102 and wireless extender device 104 are through a secure communication link 112.

Figure 1D:
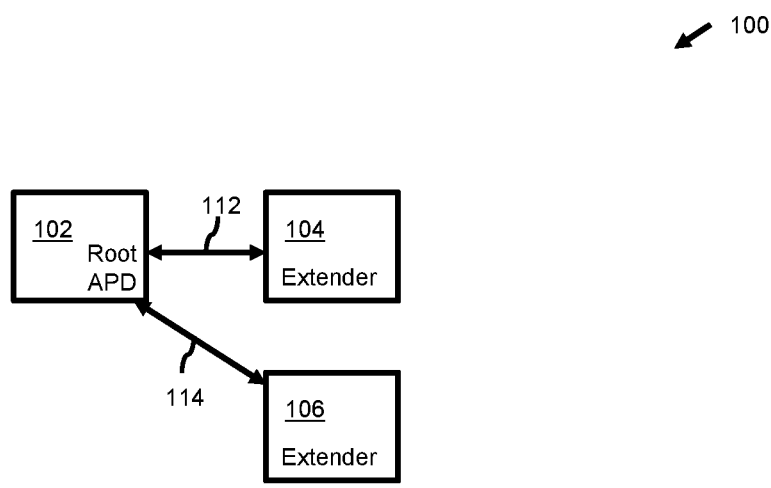
FIG. 1D illustrates the Wi-Fi communication network in FIG. 1A at time $t_3$.

FIG. 1D illustrates the Wi-Fi communication network in FIG. 1A at time $t_3$. At this time, wireless extender device 106 has successfully completed the onboarding process, similar to the onboarding process done by wireless extender device 104, and is now part of the wireless network 100. All communications between root APD 102 and wireless extender device 106 are through secure communication link 114. Note that both wireless extenders 104 and 106 are considered first hop of wireless links between access points (from root APD 102) in the network.

Figure 1E:
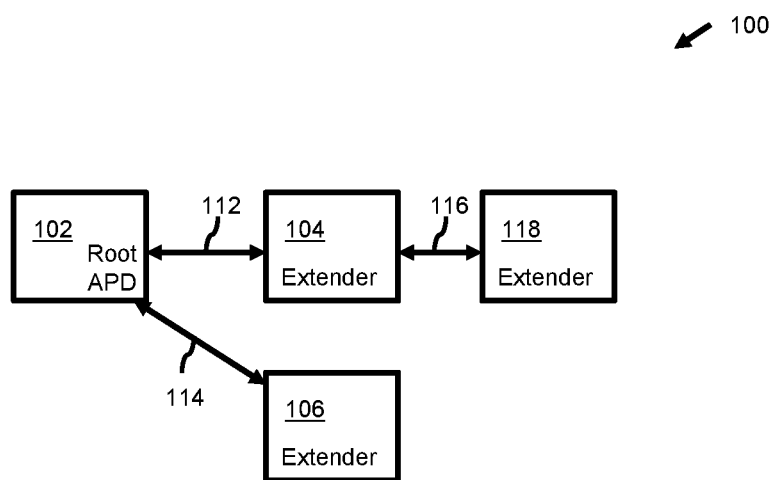
FIG. 1E illustrates the Wi-Fi communication network in FIG. 1A at time $t_4$.

FIG. 1E illustrates the Wi-Fi communication network in FIG. 1A at time $t_4$. At this time, a wireless extender device 118 has successfully completed the onboarding process and is part of wireless network 100. Wireless extender device 118 is connected with root APD 102 via wireless extender device 104. In this scenario, wireless extender device 118 is the $2^{nd}$ hop of wireless link between access points (from root APD 102) in the network. All communications between wireless extender device 118 and wireless extender device 104 are through a secure communication link 116.

Figure 1F:
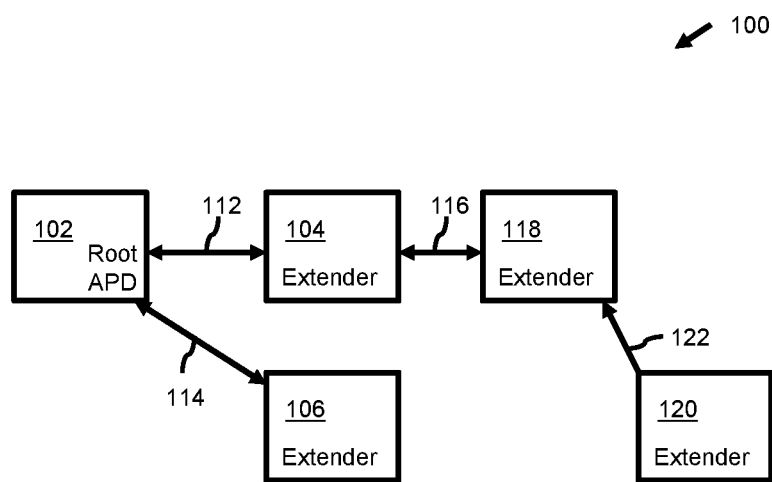
FIG. 1F illustrates the Wi-Fi communication network in FIG. 1A at time $t_5$.

FIG. 1F illustrates the Wi-Fi communication network in FIG. 1A at time $t_5$. At this time, a wireless extender device 120 is requesting wireless extender device 118, using uplink communication stream 122, the Wi-Fi BSS support so it can connect to root APD 102 via wireless extenders 118 and 104, and be part of wireless network 100. In this scenario, if wireless extender device 120 successfully completes the onboarding process, it will be considered a $3^{rd}$ hop of wireless link (from root APD 102) in the network.

Figure 2:
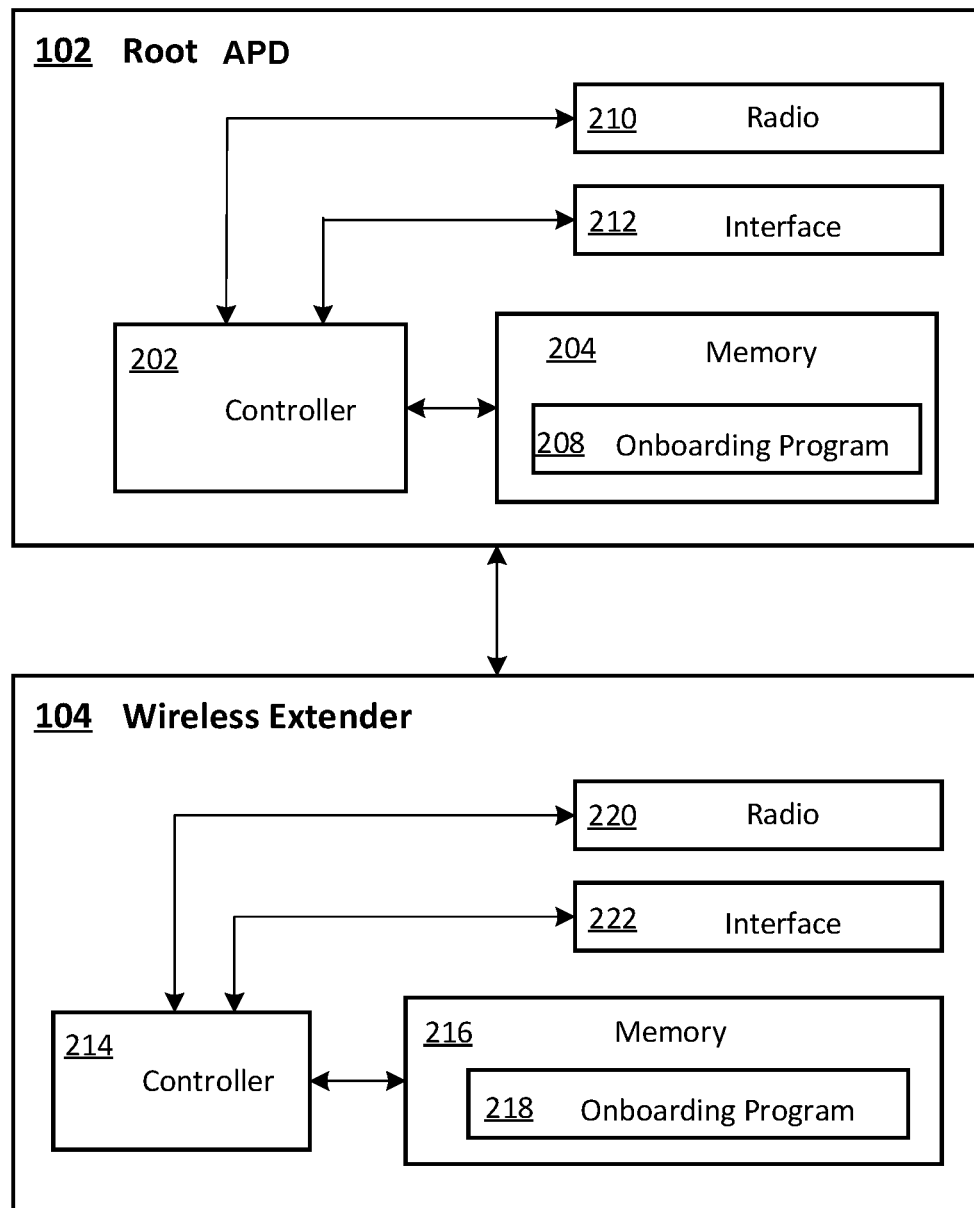
FIG. 2 illustrates an exploded view of the root APD device and the extender device in the communication network of FIG. 1A.

FIG. 2 illustrates an exploded view of root APD device 102 and wireless extender device 104 of FIG. 1A.

As shown in FIG. 2, root APD 102 includes: a controller 202; a memory 204, which has stored therein an onboarding program 208; at least one radio, a sample of which is illustrated as a radio 210; and an interface circuit 212.

In this example, controller 202, memory 204, radio 210, and interface circuit 212 are illustrated as individual devices. However, in some embodiments, at least two of controller 202, memory 204, radio 210, and interface circuit 212 may be combined as a unitary device. Whether as individual devices or as combined devices, controller 202, memory 204, radio 210, and interface circuit 212 may be implemented as any combination of an apparatus, a system and an integrated circuit. Further, in some embodiments, at least one of controller 202, memory 204, and radio 210 may be implemented as a computer having non-transitory computer-readable media for carrying or having computer-executable instructions or data structures stored thereon. Such non-transitory computer-readable recording medium refers to any computer program product, apparatus or device, such as a magnetic disk, optical disk, solid-state storage device, memory, programmable logic devices (PLDs), DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Example tangible computer-readable media may be coupled to a processor such that the processor may read information from, and write information to the tangible computer-readable media. In the alternative, the tangible computer-readable media may be integral to the processor. The processor and the tangible computer-readable media may reside in an integrated circuit (IC), an application specific integrated circuit (ASIC), or large-scale integrated circuit (LSI), system LSI, super LSI, or ultra LSI components that perform a part or all of the functions described herein. In the alternative, the processor and the tangible computer-readable media may reside as discrete components.

Example tangible computer-readable media may also be coupled to systems, non-limiting examples of which include a computer system/server, which is operational with numerous other general purpose or special purpose computing system environments or configurations. Examples of well-known computing systems, environments, and/or configurations that may be suitable for use with a computer system/server include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Such a computer system/server may be described in the general context of computer system-executable instructions, such as program modules, being executed by a computer system. Generally, program modules may include routines, programs, objects, components, logic, data structures, and so on that perform particular tasks or implement particular abstract data types. Further, such a computer system/server may be practiced in distributed cloud computing environments where tasks are performed by remote processing devices that are linked through a communications network. In a distributed cloud computing environment, program modules may be located in both local and remote computer system storage media including memory storage devices.

Components of an example computer system/server may include, but are not limited to, one or more processors or processing units, a system memory, and a bus that couples various system components including the system memory to the processor.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

A program/utility, having a set (at least one) of program modules, may be stored in the memory by way of example, and not limitation, as well as an operating system, one or more application programs, other program modules, and program data. Each of the operating system, one or more application programs, other program modules, and program data or some combination thereof, may include an implementation of a networking environment. The program modules generally carry out the functions and/or methodologies of various embodiments of the application as described herein.

Controller 202 can include a dedicated control circuit, CPU, a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of the root APD 102 in accordance with the embodiments described in the present disclosure.

Memory 204 can store various programming, and user content, and data including onboard program 208. Onboarding program includes instructions, that when executed by controller 202, enable root APD 102 to manage the onboardings of MAP agents and clients, configure the BSS support configuration for new MAP agents, monitor and identify hop link counts of all MAP agents.

Interface circuit 212 can include one or more connectors, such as RF connectors, or Ethernet connectors, and/or wireless communication circuitry, such as 5G circuitry and one or more antennas. Interface circuit 212 enables a user (not shown) to interface with controller 502 to manually operate or configure root APD 402. Interface circuit 402 further enables controller 502 to decode communication signals received by radio 210 from APDs and to encode communication signals to be transmitted by radio 220 to APDs.

Radio 210, (and preferably two or more radios), may also be referred to as a wireless communication circuit, such as a Wi-Fi WLAN interface radio transceiver and is operable to communicate with client devices and with Wi-Fi extenders 104 and 106. Radio 210 includes one or more antennas and communicates wirelessly via one or more of the 2.4 GHz bands, the 5 GHz bands, the 6 GHz bands, and the 60 GHz bands, or at the appropriate band and bandwidth to implement any IEEE 802.11 Wi-Fi protocols, such as the Wi-Fi 4, 5, 6, or 6E protocols. Root APD 102 can also be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands, or the 60 GHz bands, RF4CE protocol, ZigBee protocol, Z-Wave protocol, or IEEE 802.15.4 protocol.

Wireless extender device 104 includes: a controller 214; a memory 216, which has stored therein an onboarding program 218; at least one radio, a sample of which is illustrated as a radio 220; and an interface circuit 222; It should be noted that additional wireless extenders, including wireless extender 114, have similar structure and operation to that of Wi-Fi extender 112.

In this example, controller 214, memory 216, radio 220 and interface circuit 222 are illustrated as individual devices. However, in some embodiments, at least two of controller 214, memory 216, radio 220, and interface circuit 222 may be combined as a unitary device. Further, in some embodiments, at least one of controller 214, memory 216, radio 220, and interface circuit 222 may be implemented as a computer having tangible computer-readable media for carrying or having computer-executable instructions or data structures stored thereon.

Controller 214 can include a dedicated control circuit, CPU, a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of the wireless extender 102 in accordance with the embodiments described in the present disclosure.

Memory 216 can store various programming, and user content, and data including onboarding program 218. Onboarding program 218 include instructions, that when executed by controller 214, enable wireless extender device 104 to start the onboarding process of new MAP agents and provides the predefined fronthaul BSS and backhaul BSS configurations when requested so the new MAP agent can use them to complete onboard the network.

Radio 220, such as a Wi-Fi WLAN interface radio transceiver, is operable to communicate with root APD 102, as shown in FIG. 1A. Radio 220 includes one or more antennas and communicates wirelessly via one or more of the 2.4 GHz bands, the 5 GHz bands, the 6 GHz bands, and the 60 GHz bands, or at the appropriate band and bandwidth to implement any IEEE 802.11 Wi-Fi protocols, such as the Wi-Fi 4, 5, 6, or 6E protocols. Wireless extender 102 can also be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands, of the 60 GHz bands, RF4CE protocol, ZigBee protocol, Z-Wave protocol, or IEEE 802.15.4 protocol.

Interface circuit 222 can include one or more connectors, such as RF connectors, or Ethernet connectors, and/or wireless communication circuitry, such as 5G circuitry and one or more antennas. Interface circuit 222 enables a user (not shown) to interface with controller 214 to manually operate or configure wireless extender device 104. Interface circuit 222 further enables controller 214 to decode communication signals received by radio 220 from root APD 402, any other APDs and any wireless client devices (not shown), and to encode communication signals to be transmitted by radio 220 to root APD 402, any other APDs and any wireless client devices (not shown).

Using the scenario presented in FIG. 1F, when wireless network 100 reaches 3 hop counts and beyond, all communications between all devices in the network will become inefficient, diluted and network services will be greatly affected due to communications between client devices require to go through many hops.

In any mesh network, and residential networks in particular, it is important to control the limit of the number of wireless links (hops) between mesh nodes (APs). Assuming that use of the backhaul BSS availability will provide a robust means of controlling the hop count, in a standard EasyMesh network implementation, for example, a default network size limit of 2 hops is recommended. Referring to FIG. 1E, wireless network 100 consists of root APD 102, wireless extenders 104 and 106 as the first hop link (hop #1), and wireless extender device 118 as the second hop link (hop #2), wireless extender device 118 (hop #2) can be configured to not have a backhaul BSS (only one or more fronthaul BSS); additionally, root APD 102 and both wireless extenders 104 and 106 (hop #1) can be configured with fronthaul BSS and backhaul BSS. By not configuring a backhaul BSS on wireless extender device 118, wireless network 100 is limiting any additional wireless extender (i.e. hop #3) from associating its bSTA and creating a third wireless link hop from root APD 100.

However, the MAP specification does not explicitly specify what a MAP Agent is to do if it does not fully succeed in getting the backhaul BSS credentials of an existing MAP Agent device; e.g. if it does not get a WPS M2 message from existing Agent with MAP extension sub-element indicating support for backhaul BSS, following the new Agent's WPS M1 message with MAP extension sub-element indicating its need for the existing Agent's backhaul BSS credentials. The new MAP Agent will not be able to create a backhaul BSS association via its bSTA in this case, but the assumption has been that it will not stay associated with the fronthaul BSS used during this WPS operation to get a backhaul BSS association in this case. Moreover, in a recent test using a certified MAP Agent, it shows that its bSTA does stay associated with an existing MAP Agent's fronthaul BSS following WPS pairing when the existing MAP Agent does not have its backhaul BSS configured and is not indicating backhaul BSS support.

One solution to this problem is to change the standard to address the spec uncertainty noted above by specifying that a MAP Agent behave is expected. However, this is unlikely to occur due to strict requirements for modifying the standard and the time it takes to implement the new change if approved.

Another solution to this problem is to request the Wi-Fi vendors to provide the MAP Agent logic to provide the expected behavior as noted. However, this is also problematic given the current implementation/spec assumption, plus any change would take considerable time. Moreover, following such a process is not scalable as it would have to be applied with each different MAP Agent vendor where the issue is occurred.

In summary, there is a need for a more robust solution to limit EasyMesh network hop count restriction rather than just relying on disabling backhaul BSS on max hop count MAP Agents, counting on MAP spec change, or pursuing MAP Agent vendor by vendor custom changes.

What is needed is a system and method for control hop limitation in a Wi-Fi multi-access point network.

A system and method in accordance with the present disclosure control hop limitation in a Wi-Fi multi-access point device network.

In accordance with the present disclosure, the invention allows control of a configurable hop limitation in a wireless network with multiple MAP agent devices, e.g. wireless extenders. By keeping the low hop links in the network, the network can operate efficiently and lower the chances of service disruption to a hop.

As will be discussed in more detail, there are several solutions for providing a configurable hop link limit ($n^{th}$ hop limit) in a wireless network. Each solution has different advantages and disadvantage. These solutions are discussed below followed by a summary of their advantages and disadvantages.

All solutions make use of controller logic that resides in the MAP controller. Note that, the controller logic residing in the MAP controller is not governed by EasyMesh. Instead, it is intended to be vendor-specific for product differentiation. The controller logic is required to monitor reported network topology discovered by the MAP controller for awareness of network topology conditions so that all $n^{th}$ hop MAP agents are known.

Solution 1: The control logic residing in the MAP controller must configure all MAP agents with a configurable $n^{th}$ hop limit to have their fronthaul BSS(s) enabled and their backhaul BSS disabled. The control logic must also blacklist all MAP agent bSTAs from being allowed to associate with the fronthaul BSS(s) of $n^{th}$ hop MAP agents in the network. This requires the control logic to command its MAP controller to issue a client association control request message with TLV configured for the target MAP Agents with $n^{th}$ hop limit fronthaul BSS(s), with association control block set, and with STA listings for all MAP agent bSTAs. In support of this blacklisting, it requires the controller to be able to discover all new MAP agents, including those that end up having their bSTA associated with the fronthaul BSS of an $n^{th}$ hop extender (following WPS and prior to the blacklisting). One way of this discovery is, if the MAP agent with fronthaul BSS association initiates MAP controller discovery, then it is able to reach the MAP controller and its controller logic. This is not ruled out by the MAP spec, although not clear it if will occur. Another way of discovery is for the control logic on the MAP controller to keep a list certified MAP agent vendor information (e.g. host name information) that it can match from controller device table information (e.g. host info from DHCP requests). As noted, the network changes over time so controller logic must dynamically monitor conditions and update its $n^{th}$ hop MAP agent configurations for disabling backhaul BSS and blacklisting MAP agents on its fronthaul BSS respectively.

Solution 2: The control logic residing in the MAP controller must configure all MAP agents with a configurable $n^{th}$ hop limit to have their fronthaul BSS(s) enabled and their backhaul BSS enabled (as with all other MAP agents). The control logic must also configure a zero-association count restriction on the backhaul BSS for $n^{th}$ hop MAP agents. This requires the control logic to command its MAP controller to issue a MAP Higher Layer Data (HLD) TLV with vendor specific signaling indicating the requested zero-association configuration to MAP agents with $n^{th}$ hop limit. This solution requires that a vendor-specific local control agent be added on all MAP agent devices to be able to process the HLD message with zero-association configuration. The local control agent must directly configure the local Wi-Fi client when receiving the HLD message from its MAP agent device since there is no MAP agent configuration for this setting. Additionally, tt also requires that the Wi-Fi driver on the MAP agent devices be able to support a zero-count association limit. As noted above, the network changes over time so controller logic must dynamically monitor conditions and update its $n^{th}$ hop MAP agent devices' backhaul BSS driver zero-association configuration.

Solution 3: The control logic residing in the MAP controller must configure all MAP agents with a configurable $n^{th}$ hop limit to have their fronthaul BSS(s) enabled and their backhaul BSS enabled (as with all other MAP agents). The controller logic must also whitelist no STAs from being allowed to associate with the backhaul BSS of $n^{th}$ hop MAP agents in the network. This requires the control logic to command its MAP controller to issue a client association control request message with TLV configured for the target MAP agents with $n^{th}$ hop limit (BSS ID), with association control unblock set, and with STA listing for "effectively" no STAs. The MAP spec requires at least on STA to be listed in a client association control request message TLV. Consequently, this signaling configuration can set the unblock list to 1 and add a dummy (unlikely to be present) STA MAC address. As noted above, the network change over time so controller logic must dynamically monitor conditions and update its $n^{th}$ hop MAP agent configurations for "empty" whitelisting of STA on their backhaul BSS.

An example system and method for controlling hop limitation in a Wi-Fi multi-access point network in accordance with aspects of the present disclosure will be described in greater detail with reference to FIGS. 3-5.

Figure 3:
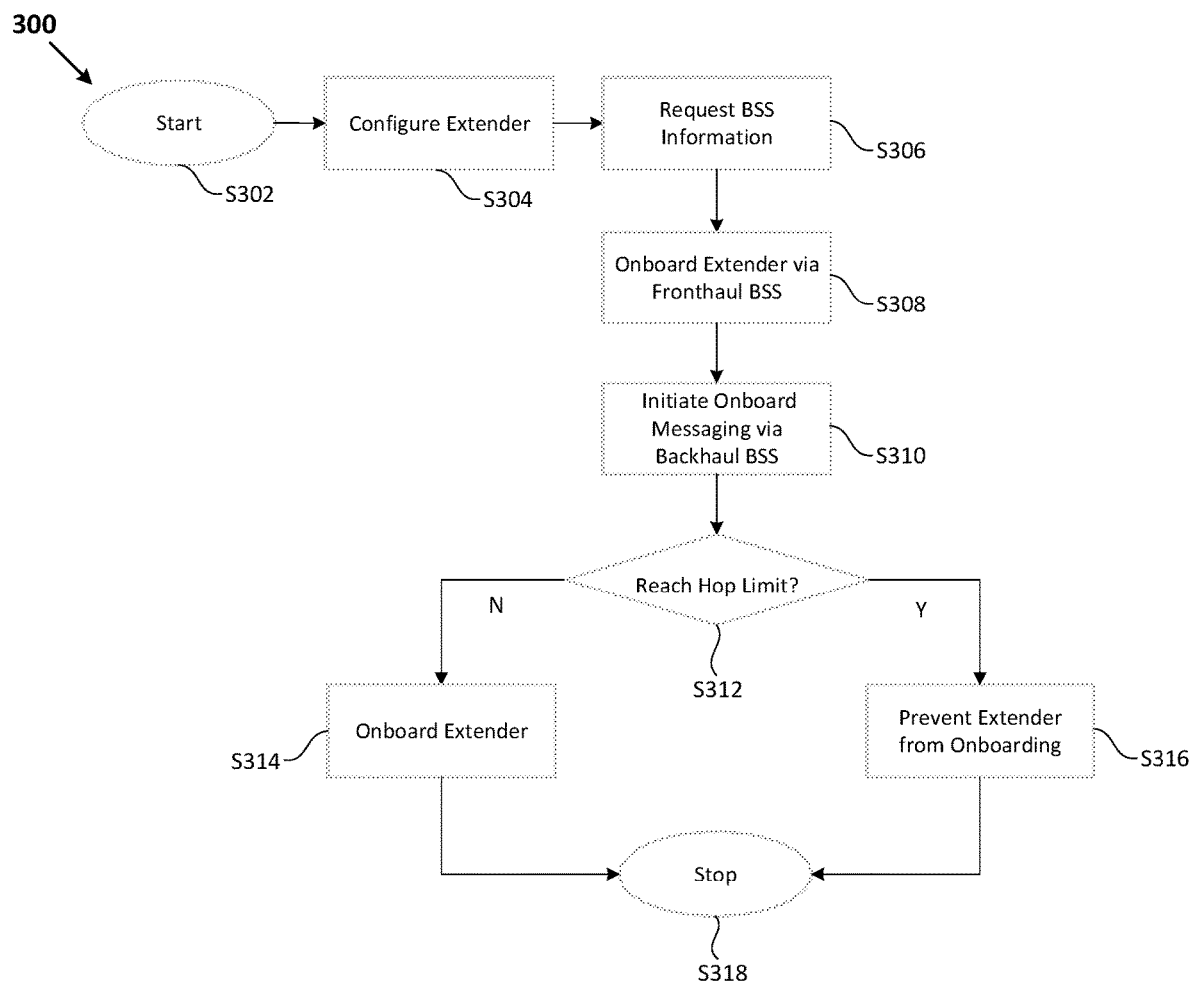
FIG. 3 illustrates an example method for controlling hop limitation in a Wi-Fi multi-access points network, in accordance with aspects of the current disclosure.

FIG. 3 illustrates an example algorithm 300 to be executed by a processor for controlling hop limitation in a Wi-Fi multi-access point network, in accordance with aspects of the present disclosure.

As shown in FIG. 3, algorithm 300 starts (S302) and a new wireless extender is configured (S304). This will be further described with additional references to FIG. 4A through FIG. 4G.

Figure 4A:
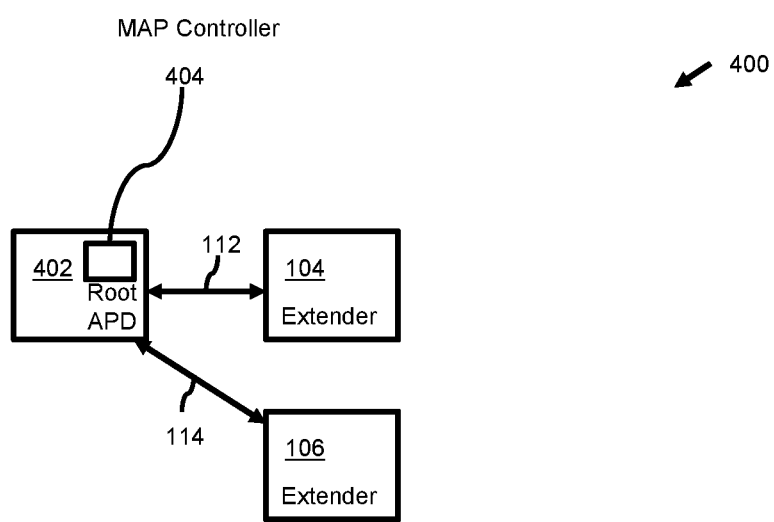
FIG. 4A illustrates structural components implementing a wireless network at time $t_6$, in accordance with aspects of the current disclosure.

FIG. 4A illustrates a wireless network 400 at a time $t_6$, in accordance with aspects of the current disclosure.

As shown in FIG. 4A, wireless network 400 includes: a root APD 402 and a plurality of wireless extenders, a sample of which are illustrated as wireless extenders 104 and 106.

Root APD 402 contains inside a MAP controller 404. Root APD 402 communicates with wireless extender device 104 via secure communication link 112. Root APD 402 also communicates with wireless extender device 106 via secure communication link 114.

As shown in this figure, MAP controller 404 inside root APD 402 controls and identifies all MAP agents, e.g. wireless extenders, in wireless network 400. At time $t_6$, MAP controller 404 identifies that the network has only one hop link where wireless extenders 102 and 106 are identified as hop link number one (hop #1). MAP controller 404 records positions of all wireless extenders in the network and compares the hop link number to the configured hop limitation. For example, if hop limitation in wireless network 400 is configured with 2 hops count, then MAP controller 404 will identify both wireless extenders 104 and 106 as hop #1. Since the hop limitation (previously configured as 2) has not reached, MAP controller 404 will configure both wireless extenders 104 and 106 to allow new wireless extenders that are attaching to them to onboard as new MAP agents in the wireless network 400. This will be described in greater detail with reference to FIG. 4B.

Figure 5:
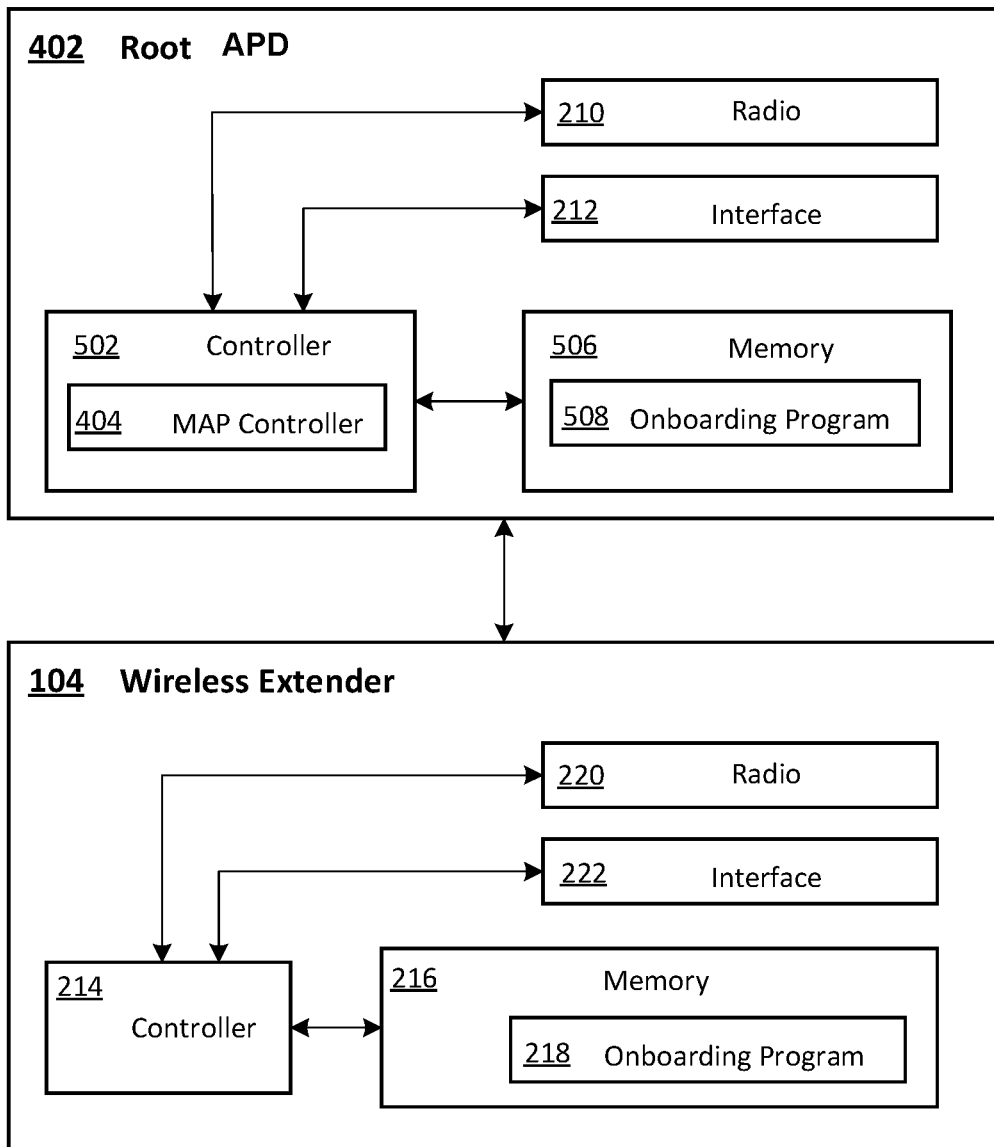
FIG. 5 illustrates an exploded view of the root APD device and the extender device in the communication network of FIG. 4A, in accordance with aspects of the current disclosure.

FIG. 5 illustrates an exploded view of root APD device 402 and wireless extender device 104 of FIG. 4A.

As shown in FIG. 5, root APD 402 includes: a controller 502; a memory 506, which has stored therein an onboarding program 508; at least one radio, a sample of which is illustrated as a radio 210; and an interface circuit 212. Inside controller 402 resides MAP controller 404.

In this example, controller 502, memory 506, radio 210, and interface circuit 212 are illustrated as individual devices. However, in some embodiments, at least two of controller 502, memory 506, radio 210, and interface circuit 212 may be combined as a unitary device. Whether as individual devices or as combined devices, controller 502, memory 506, radio 210, and interface circuit 212 may be implemented as any combination of an apparatus, a system and an integrated circuit. Further, in some embodiments, at least one of controller 502, memory 506, radio 210, and interface circuit 212 may be implemented as a computer having non-transitory computer-readable media for carrying or having computer-executable instructions or data structures stored thereon.

Controller 502 can include a dedicated control circuit, CPU, a hardware processor such as a microprocessor, a multi-core processor, a single core processor, a field programmable gate array (FPGA), a micro controller, an application specific integrated circuit (ASIC), a digital signal processor (DSP), or other similar processing device capable of executing any type of instructions, algorithms, or software for controlling the operation and functions of the root APD 402 in accordance with the embodiments described in the present disclosure. Additionally, controller 502 also contains MAP controller 404 which is used to identify the hop counts in the network and allow new wireless extenders to onboard as new MAP agents if the hop limitation has not reached or prevent new wireless extenders to onboard as new MAP agents when the hop limitation has been reached.

Memory 506 can store various programming, and user content, and data including onboarding program 508. In some embodiments, as will be discussed in more detail below, onboarding program 508 includes instructions, that when executed by controller 502, enable root APD 402 to: configure wireless extender device 104 not to exceed a configurable hop limit; cause wireless extender device 104 to initiate messaging with root APD 402 via the root fronthaul BSS to receive credentials for the root backhaul BSS; cause wireless extender device 104 to onboard onto root APD 402 via the root backhaul BSS using the received credentials; enable a second wireless extender to initiate messaging to the first fronthaul BSS of wireless extender device 104 to obtain the credentials for the first backhaul BSS; and prevent the second wireless extender from onboarding onto the backhaul BSS of wireless extender device 104, in a case where the backhaul hop limit is configured to be one, so as to cause the second wireless extender device to only be permitted to onboard onto root APD 402.

In some embodiments, as will be discussed in more detail below, onboarding program 508 include instructions, that when executed by controller 502, enable root APD 402 to cause root APD 402 to prevent, in a case that a configured $n^{th}$ hop limit has been reached, an n+1 wireless extender from onboarding onto the backhaul BSS of an $n^{th}$ wireless extender so as to force the n+1 wireless extender instead to be onboarded onto root APD 402 or a another wireless extender that is n−1 hops or less from root APD 402 by disabling the backhaul BSS of the wireless extender device 104 and blacklisting any other wireless extenders on a fronthaul BSS of the $n^{th}$ wireless extender.

In some embodiments, as will be discussed in more detail below, onboarding program 508 include instructions, that when executed by controller 502, enable root APD 402 to cause root APD 402 to prevent, in a case that a configured $n^{th}$ hop limit has been reached, an n+1 wireless extender from onboarding onto the backhaul BSS of an $n^{th}$ wireless extender so as to force it instead to onboard onto root APD 402 or another wireless extender that is n−1 hops or less from root APD 402 by configuring a zero-association count restriction on the backhaul BSS of the $n^{th}$ wireless extender.

In some embodiments, as will be discussed in more detail below, onboarding program 508 include instructions, that when executed by controller 502, enable root APD 402 to cause root APD 402 to prevent, in a case that the hop limit has been reached, wireless extender device 118 from onboarding onto the backhaul BSS of the attached wireless extender device 118 so as to onboard onto one of root APD 402 or wireless extender device 106 by configuring the zero-association count restriction on the backhaul BSS of wireless extender device 104 via an HLD TLV field.

In some embodiments, as will be discussed in more detail below, onboarding program 508 include instructions, that when executed by controller 502, enable root APD 402 to cause root APD 402 to prevent, in a case that a configured $n^{th}$ hop limit is reached, an n+1 wireless extender from onboarding onto the backhaul BSS of an $n^{th}$ wireless extender so as to force the $n^{th}$ wireless extender device to instead onboard onto root APD 402 or another wireless extender that is n−1 hops or less from root APD 402 by whitelisting, on the backhaul BSS of the $n^{th}$ wireless extender, either no wireless extenders or a dummy wireless extender.

Interface circuit 212 can include one or more connectors, such as RF connectors, or Ethernet connectors, and/or wireless communication circuitry, such as 5G circuitry and one or more antennas.

Radio 210 (and preferably two or more radios) may also be referred to as a wireless communication circuit, such as a Wi-Fi WLAN interface radio transceiver, and is operable to communicate with client devices and with Wi-Fi extenders 104 and 106. Radio 210 includes one or more antennas and communicates wirelessly via one or more of the 2.4 GHz bands, the 5 GHz bands, the 6 GHz bands, and the 60 GHz bands, or at the appropriate band and bandwidth to implement any IEEE 802.11 Wi-Fi protocols, such as the Wi-Fi 4, 5, 6, or 6E protocols. Root APD 102 can also be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands, or the 60 GHz bands, RF4CE protocol, ZigBee protocol, Z-Wave protocol, or IEEE 802.15.4 protocol.

Returning to FIG. 3, after the new wireless extender has been configured (S304), BSS information is requested (S306). For example, the new wireless extender may search the network for an existing MAP agent to attach to and, subsequently, to request for the fronthaul and backhaul BSS credentials from the MAP agent for which is desires to attach. This will be described in greater detail with reference to FIG. 4B.

Figure 4B:
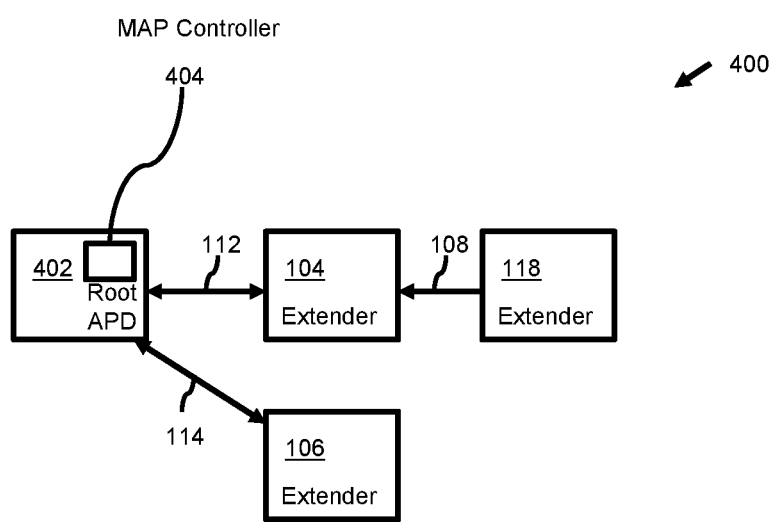
FIG. 4B illustrates the wireless network in FIG. 4A at time $t_7$.

FIG. 4B illustrates wireless network 400 in FIG. 4A at a time $t_7$.

FIG. 4B is similar to FIG. 4A; however, at time $t_7$, wireless extender device 118 is newly configured and requests wireless extender 108, via uplink communication stream 108, the Wi-Fi BSS support information so it can connect to root APD 402 via wireless extender device 104, and onboard as a new MAP agent in wireless network 400.

Returning to FIG. 3, after BSS information is requested (S306), the extender is onboarded via the fronthaul BSS (S308). For example, the new wireless extender onboards the existing MAP agent that it attached to via the fronthaul BSS using the BSS credentials previously provided. As shown in FIG. 4B, wireless extender device 120 will use the provided front BSS credential to onboard wireless network 104.

Returning to FIG. 3, the extender is onboarded via the fronthaul BSS (S308), the new wireless extender initiates onboard messaging via backhaul BSS (S310). This will be described in detail with reference to FIG. 4C.

Figure 4C:
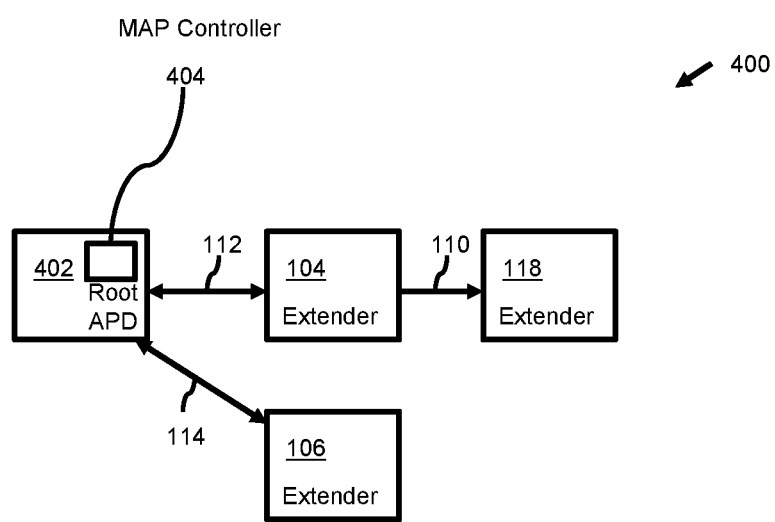
FIG. 4C illustrates the wireless network in FIG. 4A at time $t_8$.

FIG. 4C illustrates wireless network 400 in FIG. 4A at a time $t_8$.

In FIG. 4C, at time $t_8$, wireless extender device 118 receives the BSS information from wireless extender device 104 via downlink communication 122. Based the configuration given by MAP controller 404, the provided BSS information will include both fronthaul and backhaul BSS enabled. Additionally, MAP controller 404 will assign wireless extender device 118 as the second hop link (hop #2) in wireless network 400. With the provided BSS credentials, wireless extender device 118 can proceed to onboard wireless network 400 as a new MAP agent.

Returning to FIG. 3, after the new wireless extender has initiated its messaging (S310), it is determined whether a hop limit has been reached (S312). For example, the extender can be onboard as a new MAP agent by comparing the new wireless extender assigned hop number with the configured hop limitation value. Referring to FIG. 4C, when receiving the onboard messaging from wireless extender device 118, MAP controller 404 identifies that wireless extender device 118 hop link is number 2 (hop #2) since it is directly attached to wireless extender device 104 which has been assigned as hop link number one (hop #1). MAP controller 404 will save the assigned hop link value of wireless extender device 118 and update the total hop count value into memory 506 (referring to FIG. 5). Additionally, MAP controller 404 also will formulize the BSS configuration for wireless extender device 118 based on the placement of its hop count since it reaches the hop limitation number. This will be further discussed in detail with reference to FIG. 4D.

Returning to FIG. 3, if it is determined that the hop limit value has not been reached (N at S312), then the MAP controller will onboard the extender (S314). For example, referring to FIG. 4D, in a case when the hop limitation is configured to allow only 2 hop links in the network, MAP controller 402 identifies that wireless extender device 118 would be hop link number 2, so wireless extender device 118 will be allowed onboard since its hop value (hop #2) has not reached beyond the hop limitation value.

Figure 4D:
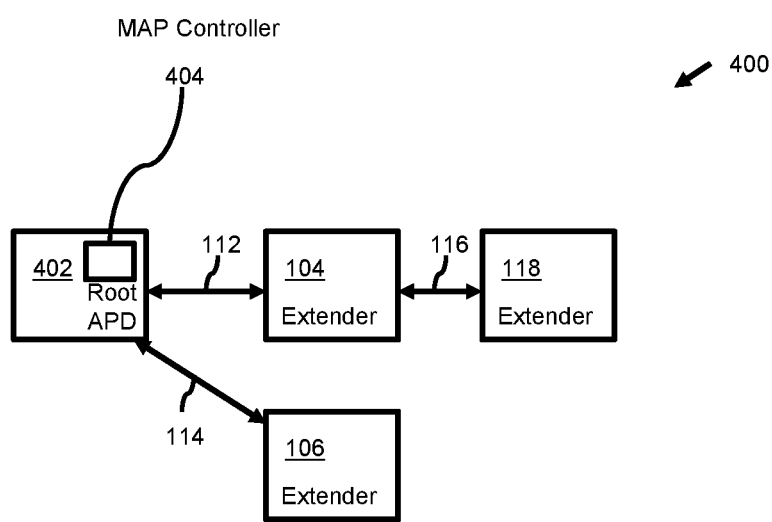
FIG. 4D illustrates the wireless network in FIG. 4A at time $t_9$.

FIG. 4D illustrates wireless network 400 in FIG. 4A at a time $t_9$.

In FIG. 4D, at time $t_9$, wireless extender device 118 has been successfully onboarded to wireless network 400 as a new MAP agent. Additionally, MAP controller 404 assigns wireless extender device 118 as the second hop link (hop #2) in wireless network 400 and configures wireless extender device 118 to have its BSS credentials as one of the following: (1) its fronthaul BSS enabled and backhaul BSS disabled; (2) both fronthaul BSS and backhaul BSS enabled and also include a zero-association count restriction on its backhaul BSS; or (3) both fronthaul BSS and backhaul BSS enabled and also include a whitelisting configuration with no clients or a dummy client allowed to associate with its backhaul BSS, in accordance with aspects of the current disclosure.

Returning to FIG. 3, after S314, the algorithm 300 completes at S318. In this scenario, referring to FIG. 4D, wireless extender device 118 completes its onboarding process as a new MAP agent in wireless network 400 since the hop limitation has only reached that maximum allowed hop counts (2).

However, if it is determined that the hop limit value has been reached (Y at S312), then the MAP controller will prevent the extender from completing the onboarding process (S316). This will be further described in detail with references to FIG. 4E to FIG. 4H.

Figure 4E:
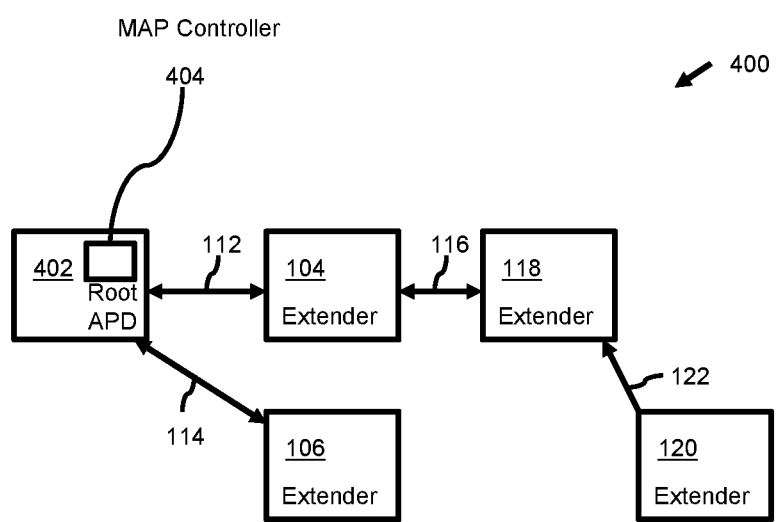
FIG. 4E illustrates the wireless network in FIG. 4A at time $t_{10}$.

FIG. 4E illustrates wireless network 400 in FIG. 4A at a time $t_{10}$.

In FIG. 4E, at time $t_{10}$, wireless extender device 120 is newly configured and requests wireless extender device 118, via uplink communication stream 122, the Wi-Fi BSS support information so it can connect to root APD 402 via wireless extenders 118 and 104, and onboard as a new MAP agent in wireless network 400.

Figure 4F:
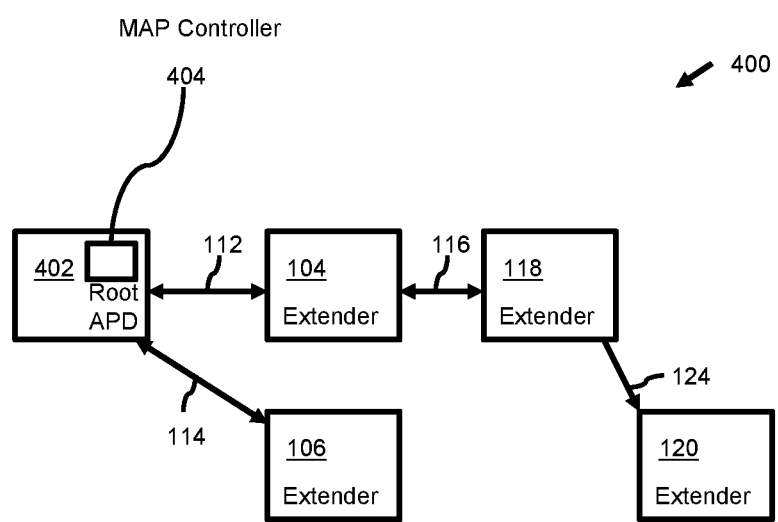
FIG. 4F illustrates the wireless network in FIG. 4A at time $t_{11}$.

FIG. 4F illustrates wireless network 400 in FIG. 4A at a time tn.

In FIG. 4F, at time $t_{11}$, wireless extender device 120 receives the BSS information from wireless extender device 118 via downlink communication 124. MAP controller 404 assigns wireless extender device 120 as the third hop link (hop #3) in wireless network 400. In this scenario, wireless extender device 120 has reached beyond the configured hop limitation (maximum of 2 hops). When wireless extender device 118 sends the BSS configurations to wireless extender device 120, the BSS configuration (as defined by MAP controller 404) consists of one of the following: (1) its fronthaul BSS enabled and backhaul BSS disabled; (2) both fronthaul BSS and backhaul BSS enabled and also include a zero-association count restriction on its backhaul BSS; or (3) both fronthaul and backhaul BSS(s) enabled and also include a whitelisting configuration with no clients or a dummy client allowed to associate with its backhaul BSS, in accordance with aspects of the current disclosure. With the provided BSS credentials, wireless extender device 120 will try to onboard wireless network 400 as a new MAP agent.

Figure 4G:
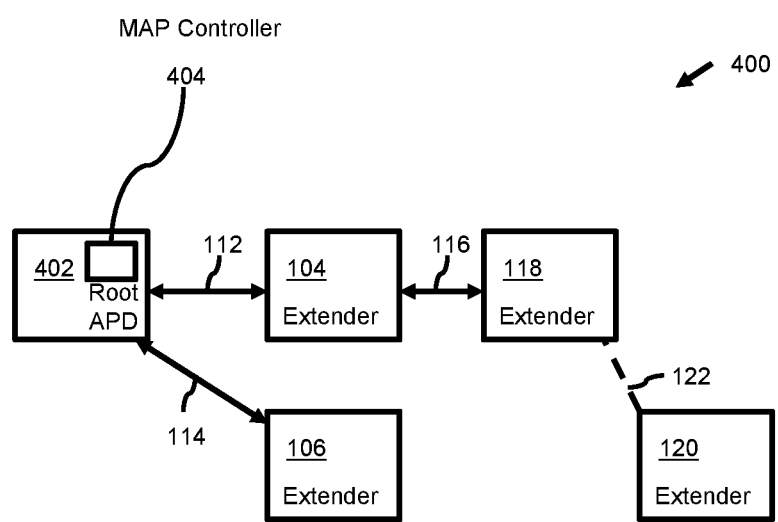
FIG. 4G illustrates the wireless network in FIG. 4A at time $t_{12}$.

FIG. 4G illustrates wireless network 400 in FIG. 4A at a time $t_{12}$.

In FIG. 4G, at time $t_{12}$, wireless extender device 120 tries to onboard wireless network 400 via wireless extender device 118 as a new MAP agent using the provided BSS configuration. However, wireless extender device 120 fails to onboard as a new MAP agent. In this scenario, wireless extender device 120 tries to use the provided backhaul BSS credential to onboard as a new MAP agent, however it experiences one of the following: (1) cannot access wireless extender device 118 due to its backhaul BSS is disabled; (2) cannot access wireless extender device 118 due to the zero-association count restriction; or (3) cannot access wireless extender device 118 due to its IP address/hostname does not match the clients configured in the whitelist.

Returning to FIG. 3, after the extender is prevented from completing the onboarding process (S316), algorithm 300 stops (S318). In this scenario, referring to FIG. 4G, wireless extender device 120 was not able to complete the onboarding process as a new MAP agent in wireless network 400 since its hop link is above the hop limitation in wireless network 400. In order to onboard as a new MAP agent, wireless extender device 120 has to be manually switched to attach to wireless extender device 106 to restart its onboarding process once again. This will be further discussed with reference to FIG. 4H.

Figure 4H:
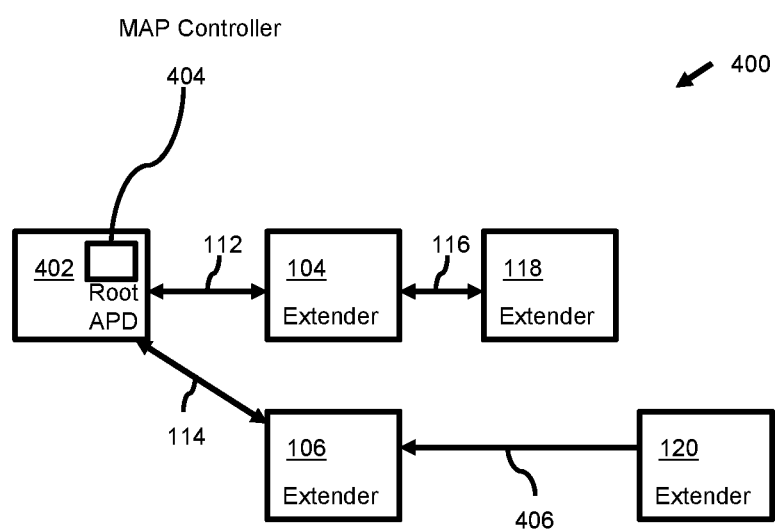
FIG. 4H illustrates the wireless network in FIG. 4A at time $t_{13}$.

FIG. 4H illustrates wireless network 400 in FIG. 4A at a time $t_{13}$.

In FIG. 4H, after wireless extender device 120 failed to onboard wireless network 400 as a new MAP agent at time $t_{12}$ (FIG. 4G), wireless extender device 120 then manually redirects to wireless extender device 106 to repeat its onboarding process.

In this scenario, since wireless extender device 106 is only the first hop link (hop #1) in wireless network 400, wireless extender device 120 will be able to successfully onboard as a new MAP agent with its newly assigned hop link as the second hop link (hop #2).

In a wireless mesh network, particularly a residential network, without having control over wireless links (hops) can greatly affect its overall operation and potentially disrupt services within the network. As the wireless hop links grows, communication between all devices in the network becomes inefficient as they have to go through multiple hops. Additionally, service disruption to group of clients attached to an extender (a hop) happens more frequently. Thus, it is important to put a limit on number of wireless links in a wireless network to maintain the network operation and performance at an optimum level.

In accordance with the present disclosure, a MAP controller algorithm resides inside the root APD is required to control, monitor, and configure MAP agent devices based on a configurable hop limitation in the network. When the hop limitation is reached, the MAP controller algorithm will prevent all subsequent wireless extenders to onboard as a new MAP agent.

Consequently, the present disclosure as disclosed keeps the wireless mesh network performance and services at an optimum level while minimizing the network disruption due to limiting number of wireless links in the network.

The foregoing description of various preferred embodiments have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A root access point device (APD), the root APD comprising:
    a memory;
    a processor configured to execute instructions stored on the memory to cause the root APD to:
        onboard a first wireless extender based on a first hop count associated with the first wireless extender not reaching a hop limitations via a root backhaul BSS using credentials received from the root APD; and
        prevent a second wireless extender from onboarding onto the first wireless extender based on a second hop count associated with the second wireless extender reaching a second hop limitation.

2. The root APD of claim 1, wherein preventing the second wireless extender from onboarding onto the first wireless extender comprise at least one of:
    disabling a backhaul BSS of the first wireless extender that is at the hop limitation; and
    blacklisting the second wireless extender on a fronthaul BSS of the first wireless extender that is at the hop limitation.

3. The root APD of claim 1, wherein the processor is further configured to cause the root APD to, in a case that a configured $n^{th}$ hop limit has been reached, prevent an n+1 wireless extender device from onboarding onto a backhaul BSS of an $n^{th}$ wireless extender device so as to onboard onto the root APD or another wireless extender device that is n−1 hops or less from the root APD by configuring a zero-association count restriction on the backhaul BSS of the $n^{th}$ wireless extender device.

4. The root APD of claim 3, wherein the configuring the zero-association count restriction on the backhaul BSS of an $n^{th}$ wireless extender device is via a higher layer data type-length-data (TLV) field.

5. The root APD of claim 1, wherein said processor is further configured to cause the APD to prevent, in a case that a configured $n^{th}$ hop limit is reached, an n+1 wireless extender device from onboarding onto a backhaul BSS of an $n^{th}$ wireless extender device so as to force the $n^{th}$ wireless extender device to instead onboard onto the root APD or another wireless extender device that is n−1 hops or less from the root APD by whitelisting, on the backhaul BSS of the $n^{th}$ wireless extender device, either no wireless extender devices or a dummy wireless extender device.

6. The root APD of claim 1, wherein the processor is further configured to cause the root APD to, in a case that a configured $n^{th}$ hop limit has been reached, prevent an n+1 wireless extender device from onboarding onto a backhaul BSS of an $n^{th}$ wireless extender device so as to onboard onto the root APD or another wireless extender device that is n−1 hops or less from the root APD by disabling the backhaul BSS of the first wireless extender and blacklisting any other wireless extender devices on a fronthaul BSS of the $n^{th}$ wireless extender device.

7. The root APD of claim 1, wherein a multi-access point (MAP) controller of the root APD identifies the first hop count.

8. A method of a root access point device (APD), the method comprising:
  onboarding a first wireless extender based on a first hop count associated with the first wireless extender not reaching a hop limitations via a root backhaul BSS using credentials received from the root APD; and
  preventing a second wireless extender from onboarding onto the first wireless extender based on a second hop count associated with the second wireless extender reaching a second hop limitation.

9. The method of claim 8, wherein preventing the second wireless extender from onboarding onto the first wireless extender comprises at least one of:
  disabling a backhaul BSS of the first wireless extender that is at the hop limitation; and
  blacklisting the second wireless extender on a fronthaul BSS of the first wireless extender that is at the hop limitation.

10. The method of claim 8, further comprising in a case that a configured $n^{th}$ hop limit has been reached, preventing an n+1 wireless extender device from onboarding onto a backhaul BSS of an $n^{th}$ wireless extender device so as to onboard onto the root APD or another wireless extender device that is n−1 hops or less from the root APD by configuring a zero-association count restriction on the backhaul BSS of the $n^{th}$ wireless extender device.

11. The method of claim 10, wherein the configuring the zero-association count restriction on the backhaul BSS of an $n^{th}$ wireless extender device is via a higher layer data type-length-data (TLV) field.

12. The method of claim 8, further comprising in a case that a configured $n^{th}$ hop limit is reached, preventing an n+1 wireless extender device from onboarding onto a backhaul BSS of an $n^{th}$ wireless extender device so as to force the $n^{th}$ wireless extender device to instead onboard onto the root APD or another wireless extender device that is n−1 hops or less from the root APD by whitelisting, on the backhaul BSS of the $n^{th}$ wireless extender device, either no wireless extender devices or a dummy wireless extender device.

13. The method of claim 8, further comprising in a case that a configured $n^{th}$ hop limit has been reached, prevent an n+1 wireless extender device from onboarding onto a backhaul BSS of an $n^{th}$ wireless extender device so as to onboard onto the root APD or another wireless extender device that is n−1 hops or less from the root APD by disabling the backhaul BSS of the first wireless extender and blacklisting any other wireless extender devices on a fronthaul BSS of the $n^{th}$ wireless extender device.

14. The method of claim 8, wherein a multi-access point (MAP) controller of the root APD identifies the first hop count.

15. A non-transitory, computer-readable media having one or more computer-readable instructions stored thereon, the one or more computer-readable instructions that, when executed by a processor of a root access point device (APD), cause the root APD to perform one or more operations comprising:
  onboarding a first wireless extender based on a first hop count associated with the first wireless extender not reaching a hop limitations via a root backhaul BSS using credentials received from the root APD; and
  preventing a second wireless extender from onboarding onto the first wireless extender based on a second hop count associated with the second wireless extender reaching a second hop limitation.

16. The non-transitory, computer-readable media of claim 15, wherein preventing the second wireless extender from onboarding onto the first wireless extender comprises:
  disabling a backhaul BSS of the first wireless extender that is at the hop limitation; and
  blacklisting the second wireless extender on a fronthaul BSS of the first wireless extender that is at the hop limitation.

17. The non-transitory, computer-readable media of claim 11, wherein the computer-readable instructions when executed by the processor further cause the root APD to perform one or more further operations comprising:
  in a case that a configured $n^{th}$ hop limit has been reached, preventing an n+1 wireless extender device from onboarding onto a backhaul BSS of an $n^{th}$ wireless extender device so as to onboard onto the root APD or another wireless extender device that is n−1 hops or less from the root APD by configuring a zero-association count restriction on the backhaul BSS of the $n^{th}$ wireless extender device.

18. The non-transitory, computer-readable media of claim 17, wherein the configuring the zero-association count restriction on the backhaul BSS of an $n^{th}$ wireless extender device is via a higher layer data type-length-data (TLV) field.

19. The non-transitory, computer-readable media of claim 15, wherein the computer-readable instructions when executed by the processor further cause the root APD to perform one or more further operations comprising, in a case that a configured $n^{th}$ hop limit is reached, preventing an n+1 wireless extender device from onboarding onto the backhaul BSS of an $n^{th}$ wireless extender device so as to force the $n^{th}$ wireless extender device to instead onboard onto the root APD or another wireless extender device that is n−1 hops or less from the root APD by at least one of:
  whitelisting, on the backhaul BSS of the $n^{th}$ wireless extender device, either no wireless extender devices or a dummy wireless extender device; and
  disabling the backhaul BSS of the first wireless extender and blacklisting any other wireless extender devices on a fronthaul BSS of the $n^{th}$ wireless extender device.

20. The non-transitory, computer-readable media of claim 15, wherein a multi-access point (MAP) controller of the root APD identifies the first hop count.

* * * * *